(12) United States Patent
Arefi et al.

(10) Patent No.: US 7,724,663 B2
(45) Date of Patent: May 25, 2010

(54) COUNTER BASED QUALITY OF SERVICE (QOS) CLASS UPGRADE

(75) Inventors: Hossein Arefi, Bethesda, MD (US); Venugopalan Ullanatt, Cary, NC (US); Reda Haddad, Raleigh, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 12/031,868

(22) Filed: Feb. 15, 2008

(65) Prior Publication Data

US 2008/0192764 A1 Aug. 14, 2008

Related U.S. Application Data

(63) Continuation-in-part of application No. 10/936,314, filed on Sep. 8, 2004, now Pat. No. 7,512,132.

(51) Int. Cl.
*H04L 12/28* (2006.01)
(52) U.S. Cl. .................................. 370/231; 370/389
(58) Field of Classification Search .................. None
See application file for complete search history.

(56) References Cited

U.S. PATENT DOCUMENTS

| | | | |
|---|---|---|---|
| 6,633,575 B1 * | 10/2003 | Koodli | 370/412 |
| 7,027,457 B1 * | 4/2006 | Chiussi et al. | 370/414 |
| 2004/0042456 A1 | 3/2004 | Dittmann et al. | |
| 2004/0044796 A1 | 3/2004 | Vangal et al. | |
| 2005/0044206 A1 * | 2/2005 | Johansson et al. | 709/224 |
| 2006/0120381 A1 * | 6/2006 | Hahm et al. | 370/395.4 |

FOREIGN PATENT DOCUMENTS

| | | |
|---|---|---|
| EP | 1372306 A | 12/2003 |
| WO | WO 00/56013 A | 9/2000 |

OTHER PUBLICATIONS

S. Blake, D. Black, M. Carlson, E. Davies, Z. Whang, and W. Weiss "An architecture for differentiated services", RFC 2475, 1998.
J. Heinanen, F. Baker, W. Weiss, J. Wroclawski "Assured Forwarding PHB Group", RFC 2597, Jun. 1999.
Stephan Bohacek, et al; TCP-PR: TCP for Persistant Packet Reordering; Proceedings of the 23$^{rd}$ International Conference on Distributed Computing Systems (ICDCD'03);1063-6927/03 2003 IEEE;p. 222-p. 231.
K. Nichols, et al; Definition of the Differentiated Services Field (DS Field) in the IPv4 and IPv6 Headers; Dec. 1998.
R. Braden, et al; Integrated Services in the Internet Architecture: an Overview; Jun. 1994.
Reda Nassif Haddad; SLA to Controls Mapping in Differentiated Services; Thesis to the Graduate Faculty of North Carolina State University, Raleigh; 2000.

* cited by examiner

*Primary Examiner*—Chirag G Shah
*Assistant Examiner*—Amarnauth Persaud
(74) *Attorney, Agent, or Firm*—Roger S. Burleigh

(57) ABSTRACT

A packet switched node (router), a queuing system and a method for queuing packets are described herein that use tags and manipulate counters in a manner that eliminates the reordering of the packets after a Quality of Service (QoS) class had been altered in one or more of the packets.

18 Claims, 5 Drawing Sheets

COUNTER BASED QUALITY OF SERVICE (QOS) CLASS UPGRADE

CROSS REFERENCE TO RELATED APPLICATION

This application is a continuation-in-part of U.S. patent application Ser. No. 10/936,314, filed Sep. 8, 2004, which issued as U.S. Pat. No. 7,512,132, on Mar. 31, 2009.

TECHNICAL FIELD

The present invention relates to a packet switched node (router) a queuing system and a method for queuing packets by using tags and manipulating counters in a manner that eliminates the reordering of the packets after a Quality of Service (QoS) class had been altered in one or more of the clients packets.

BACKGROUND

Mechanisms that provide various levels of QoS use schedulers and queues to offer privileged treatment or services to clients. These clients can vary from rental car customers waiting to be served in various queues depending on their membership level, to processes waiting to be executed on a computer . . . to packets belonging to various QoS classes waiting to be serviced by a router in a network.

In a queuing system, the clients with higher precedence classes have higher service rates or get serviced before the clients in the lower precedence classes. The privilege given to the clients in higher precedence classes causes a relatively shorter waiting time for them when compared to the clients in lower precedence classes. As a result, the clients in the higher precedence classes in general are able to leave the queuing system earlier than the clients in the lower precedence classes. To accomplish this, the queuing system often changes the sequence of clients to service the higher precedence clients before the lower precedence clients.

In some cases, when there are no clients with higher precedence classes waiting to be serviced, the queuing system may decide to "promote" a lower precedence class client to be serviced as a high precedence class client. This may be done to keep the efficiency high in the queuing system. In other cases, when a high precedence class is over-booked with clients then the queuing system may decide to "demote" a higher precedence class client to be serviced as a low precedence class client. After a queuing system "remarks" (promotes or demotes) a client, then there is a potential to reorder the clients which in some applications can be problematic. For example, in a traditional queuing system like the one used in the routers of a network, whenever a packet (client) is promoted or demoted from one QoS class to another QoS class then this may result in a reordering in either the same node in which the remark occurred or in a downstream node. The reordering of packets can be problematical as will be discussed next with respect to the network 100 shown in FIG. 1.

Referring to FIG. 1 (PRIOR ART), there is shown an exemplary network 100 which has a source computer 102 (user 102) that communicates with a destination computer 104 (user 104) via multiple routers/nodes 106 (only 9 routers/nodes 106 shown). Each router 106 includes a queuing system 108 with a queue 110 and a scheduler 112 that implements a traditional queuing method 114. An example of the operation of the traditional QoS method 114 is described next with respect to two of the routers 106' and 106". Assume three packets are received at the router 106' in the order 1, 2, 3. The first and the third packets belong to the same flow (e.g. Transmission Control Protocol (TCP) flow) and have a 'lower precedence' QoS class than the second packet which belongs to another flow. As such, packets 1 and 3 are stored in a lower precedence queue than packet 2. Assume packets 2 and 3 arrive at the time when packet 1 was being transmitted to router 106". After packet 1 is transmitted, the scheduler 112 in router 106' schedules packet 2 to go after packet 1 since packet 2 has a higher precedence class than packet 3. Assume also that packet 3, having complied with a certain policy, was promoted by the scheduler 112 in router 106' to a higher precedence class. In this example, the packets are transmitted in the order 1, 2, 3 to the downstream router 106".

At the downstream router 106", packet 1 waits in the lower precedence queue to be scheduled for transmission. Assume, that packet 1 finds packet 0 being transmitted so it has to wait. While packet 1 is waiting, packets 2 and 3 are received and queued in the higher precedence class. Upon completion of the transmission of packet 0, packets 2 and 3 are scheduled to go next since they are of higher precedence than packet 1. Notice that packets 1 and 3, which belong to the same flow, got reordered in the downstream router 106". This reordering of packets 1 and 3 is not desirable and strongly discouraged for the reasons discussed next.

The reordering of packets is strongly discouraged because of the high complexity and high cost associated with the handling of reordered packets. For instance, if the packets are reordered then some higher layer protocols, like TCP for example, suffer a severe performance impact since out-of-order packets indicate packet loss and therefore congestion. This problem is discussed in greater detail in the following documents (the contents of which are incorporated by reference herein):

[1] S. Bohacek, J. P. Hespanha, J. Lee, C. Lim, K. Obraczka "TCP-PR: TCP for Persistent Packet Reordering", Proceedings of the 23rd International Conference on Distributed Computing Systems, May 2003.

[2] S. Blake, D. Black, M. Carlson, E. Davies, Z. Whang, and W. Weiss "An architecture for differentiated services", RFC 2475, 1998.

[3] J. Heinanen, F. Baker, W. Weiss, J. Wroclawski "Assured Forwarding PHB Group", RFC 2597, June 1999.

In fact, in some network technologies (e.g., Asynchronous Transfer Mode (ATM)), it is strictly prohibited to reorder packets.

As can be seen, the reordering of clients (packets) which belonged to the same flow or service class when they entered the network is not desired and may even be prohibited. This reordering problem becomes even more complex when packets come in batches (i.e. flows) which are labeled with the same QoS or precedence class and which merge with other packet batches (flows) within the same QoS queue. To address this reordering problem, the assignee of the present invention has developed a queuing technique that was discussed in the aforementioned co-pending U.S. patent application Ser. No. 10/936,314. This queuing technique is also discussed in detail below with respect to FIGS. 2 and 3.

Referring to FIGS. 2-3, there are respectively illustrated a diagram of an exemplary network 200 and a flowchart of the queuing method 300 that addresses the aforementioned reordering problem. The exemplary network 200 has a source computer 202 that communicates with a destination computer 204 via multiple routers/nodes 206 (only 9 routers/nodes 206 shown). Each router 206 includes a queuing system 208 with a queue 210 and a scheduler 212 which together implement the queuing method 300. The queuing method 300 eliminates packet reordering due to the alteration of a packet's QoS class within a flow while at the same time maintaining the QoS treatment of that flow.

An example highlighting the features of the operation of the QoS queuing method 300 is described next with respect to two routers 206' and 206". Assume three packets are received at the router 206' in the order 1, 2, 3. The first and the third packets belong to the same flow (e.g. TCP flow) and have a 'lower precedence' QoS class than the second packet which belongs to another flow. As such, packets 1 and 3 are placed in a lower precedence queue than packet 2. Assume packets 2 and 3 arrive at the time when packet 1 was being transmitted to router 206". After packet 1 is transmitted, the scheduler 212 in router 206' schedules packet 2 to be transmitted first since it has a higher precedence class than packet 3. Assume also that packet 3, having complied with a certain policy, was promoted by the scheduler 212 in router 206' to a higher precedence class. The altered packet 3, assuming originally it was in QoS class 1 and is now in QoS class 2 where QoS class 2 has higher precedence than QoS class 1, is marked (step 302) with a special indicator/token 216a. The special indicator/token 216a is used to identify the old QoS class (e.g., QoS class 1) of packet 3 as well as the new QoS class (e.g., QoS class 2). The special indicator/token 216a can also indicate that the class of service of packet 3 had been altered. In this example, the packets are transmitted in the order 1, 2, 3 to the downstream router 206".

At the downstream router 206", packet 1 waits in the lower precedence queue to be scheduled for transmission and assume packet 1 finds packet 0 being transmitted and has to wait. While packet 1 is waiting, packets 2 and 3 are received and packet 2 is queued in the higher precedence class. Then, the downstream router 206" checks (step 304) the special indicator/token 216a in packet 3 and queues (step 306) packet in its original QoS class (e.g., QoS class 1) (note: packet 3 no longer has the special indicator/token 216a when it is queued in the old QoS class). The downstream router 206" also fakes the presence of the "remarked" packet 3 in the new QoS class (e.g., QoS class 2) by allocating (step 308) a proxy packet 218 in the new QoS class (e.g., QoS class 2). This is done so that the scheduler 212 can allocate the servicing of another packet in the new QoS class (e.g., QoS class 2) when the time comes to service the proxy packet 218. In particular, once the proxy client 218 is scheduled to be serviced, the head-of-line packet 1 in the old QoS class (e.g., QoS class 1) is serviced (step 308) as a new QoS class-2 packet instead of the proxy client 218. Prior to exiting the downstream router 206", the altered packet 1 is marked (step 310) as being a QoS class-2 packet by using the special indicator/token 216b. The special indicator/token 216b is used to identify the old QoS class (e.g., QoS class 1) of packet 1 as well as the new QoS class (e.g., QoS class 2). The special indicator/token 216b can also indicate that the class of service of packet 1 had been altered. In this example, the packets 1 and 3 which originally belonged to the same flow or QoS class (e.g., QoS class 1) did not get reordered but instead were transmitted in the proper order to another downstream router 206'''. This particular ordering of the packets 1 and 3 is desired.

To summarize the queuing method 300, it can be seen that the exemplary network 200 had a router 206' and a downstream router 206" which both implemented the QoS queuing method 300 where the router 206' altered (remarked) a QoS class of a packet (client) which was associated with a group of packets (clients) in a manner such that after the downstream router 206" received the altered packet and the associated packets it would not reorder the altered packet and the associated packets. To accomplish this, the router 206' functioned to mark (step 302) the altered packet with a special indicator/token 216a that indicated the old QoS class and the new QoS class of the altered packet. Then after the altered packet was received at the downstream router 206", the special indicator/token 216a was checked (step 304). The downstream router 206" then queued (step 306) the altered packet (without the special indicator/token 216a) in the old QoS class and also queued the other packets in the same flow within the old QoS class. Thereafter, the downstream router 206" allocated (step 308) a proxy client 218 in the new QoS class. Once the proxy client 218 was scheduled to be serviced, the downstream router 206" serviced (step 310) a head-of-line packet which was selected from the packets queued in the old QoS class as being in the new QoS class instead of servicing and sending the proxy client 218 to another downstream router 206'''. The downstream router 206" also functioned to mark (step 312) the head-of-line packet with a special indicator/token 216b that indicated the old QoS class and the new QoS class of the head-of-line packet before sending the marked head-of-line packet to another downstream node 206'''. The special indicator/token 216a and 216b described above can be a packet field value or a bit. For example, in Diffserv this particular packet field value or bit can be a 'special' DSCP (Differentiated Services Code Point) value that indicates for instance that this packet was AF2: Assured Forwarding 2 (A Diffserv Quality of Service Class) and now is AF1: Assured Forwarding 1 (A Diffserv Quality of Service Class).

Although this queuing system 208 and queuing method 300 works well to prevent the reordering of packets there is still a desire to have an improved queuing system and method that can more effectively ensure that packets are not reordered within the network. This particular need and other needs have been satisfied by queuing system and method of the present invention.

SUMMARY

In one aspect, the present invention provides a method for preventing the reordering of a plurality of packets within a flow after a QoS class had been altered for at least one packet that is associated with the plurality of packets. The method includes the steps of: (a) receiving the plurality of packets; (b) placing each of the received packets belonging to a same service class into a queue associated with the same service class; (c) incrementing a value of a counter associated with the same service class each time one of the received packets belongs to the same service class and also has an upgrade token attached thereto; (d) if there is a counter with a non-zero value associated with a lower service class and if one of the received packets belongs to a higher service class, then associating a tag to that received packet and decrementing the value of the counter in the lower service class; (e) scheduling a highest service class to be de-queued and decrementing if needed a non-zero value to zero in a counter associated with the highest service class; (f) de-queing one of the queued packets from the queue associated with the highest service class; (g) if the de-queued packet has the tag associated therewith, then de-queing one of the queued packets at a head-of-the-line in the queue associated with the next lowest service class; (h) repeating the first scheduling step (e), the first de-queing step (f) and if necessary the second de-queing step (g) until all of the packets in the queue associated with the highest service class have been de-queued; (i) scheduling the next lowest service class to be de-queued and decrementing if needed a non-zero value to zero in a counter associated with the next lowest service class; (j) de-queing one of the queued packets from the queue associated with the next lowest service class; (k) if the de-queued packet has the tag associated therewith, then de-queing one of the queued packets at a head-of-the-line in the queue associated with a further next lowest service class; and (l) repeating the second scheduling step (i), the third de-queing step (j) and if necessary the fourth de-queing step (k) until all of the packets in the queue associated with the next lowest service class have been de-queued. This method of preventing the reordering of a plurality of packets by using tags and manipulating counters without needing to insert and remove proxy packets into and from the queue is very efficient in terms of performance.

In another aspect, the present invention provides a packet switched node which has a queuing system that includes one or more queues and a scheduler which together prevent the reordering of a plurality of packets within a flow after a QoS class had been altered for at least one packet that is associated with the plurality of packets by implementing stored instructions to: (a) receive the plurality of packets; (b) place each of the received packets belonging to a same service class into a queue associated with the same service class; (c) increment a value of a counter associated with the same service class each time one of the received packets belongs to the same service class and also has an upgrade token attached thereto; (d) if there is a counter with a non-zero value associated with a lower service class and if one of the packets is received that belongs to a higher service class, then associate a tag to that received packet and decrement the value of the counter in the lower service class; (e) schedule a highest service class to be de-queued and decrement if needed a non-zero value to zero in a counter associated with the highest service class; (f) de-queue one of the queued packets from the queue associated with the highest service class; (g) if the de-queued packet has the tag associated therewith, then de-queue one of the queued packets at a head-of-the-line in the queue associated with the next lowest service class; (h) repeat the first scheduling step (e), the first de-queue step (f) and if necessary the second de-queue step (g) until all of the packets in the queue associated with the highest service class have been de-queued; (i) schedule the next lowest service class to be de-queued and decrement if needed a non-zero value to zero in a counter associated with the next lowest service class; (j) de-queue one of the queued packets from the queue associated with the next lowest service class; (k) if the de-queued packet has the tag associated therewith, then de-queue one of the queued packets at a head-of-the-line in a queue associated with a further next lowest service class; and (l) repeat the second scheduling step (i), the third de-queue step (j) and if necessary the fourth de-queue step (k) until all of the packets in the queue associated with the next lowest service class have been de-queued. This method of preventing the reordering of a plurality of packets by using tags and manipulating counters without needing to insert and remove proxy packets into and from the queue is very efficient in terms of performance.

In yet another aspect, the present invention provides a packet switched network having a first node that upgrades a QoS class of at least one packet which is associated with a plurality of packets within a flow and then marks the at least one upgraded packet with an upgrade token. The network also has a second node that receives the at least one upgraded packet and the remaining packets of the plurality of packets and services the at least one upgraded packet and the remaining packets of the plurality of packets such that there will be no reordering of the at least one upgraded packet and the remaining packets in the plurality of packets by: (a) placing each of the received packets belonging to a same service class into a queue associated with the same service class; (b) incrementing a value of a counter associated with the same service class each time one of the received packets belongs to the same service class and also has an upgrade token attached thereto; (c) if there is a counter with a non-zero value associated with a lower service class and if one of the received packets belongs to a higher service class, then associating a tag to that received packet and decrementing the value of the counter in the lower service class; (d) scheduling a highest service class to be de-queued and decrementing if needed a non-zero value to zero in a counter associated with the highest service class; (e) de-queing one of the queued packets from the queue associated with the highest service class; (f) if the de-queued packet has the tag associated therewith, then de-queing one of the queued packets at a head-of-the-line in the queue associated with the next lowest service class; (g) repeating the first scheduling step (d), the first de-queing step (e) and if necessary the second de-queing step (f) until all of the packets in the queue associated with the highest service class have been de-queued; (h) scheduling the next lowest service class to be de-queued and decrementing if needed a non-zero value to zero in a counter associated with the next lowest service class; (i) de-queing one of the queued packets from the queue associated with the next lowest service class; (j) if the de-queued packet has the tag associated therewith, then de-queing one of the queued packets at a head-of-the-line in the queue associated with a further next lowest service class; and (k) repeating the second scheduling step (h), the third de-queing step (i) and if necessary the fourth de-queing step (j) until all of the packets in the queue associated with the next lowest service class have been de-queued. This method of preventing the reordering of a plurality of packets by using tags and manipulating counters without needing to insert and remove proxy packets into and from the queue is very efficient in terms of performance.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
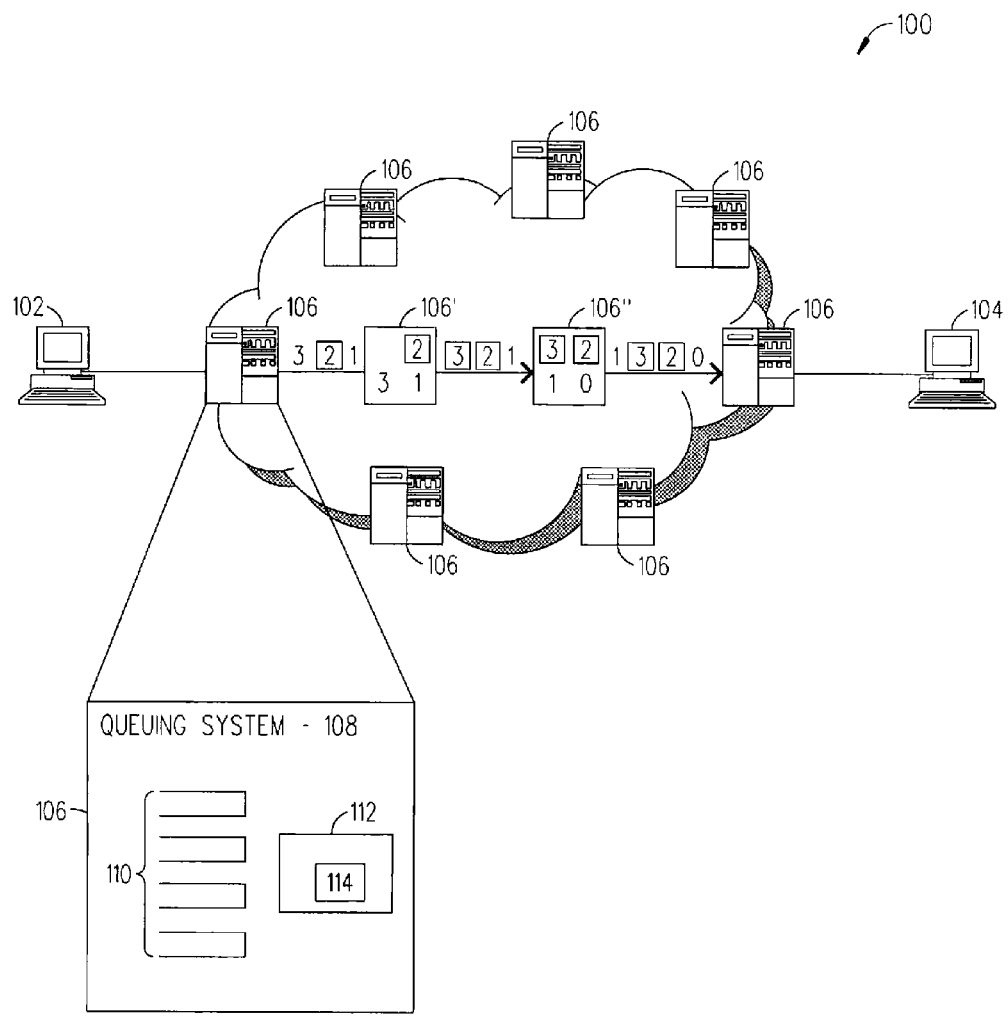
FIG. 1 (PRIOR ART) is a block diagram of a network where a first user communicates with a second user through a series of routers/nodes each of which have a queuing system incorporated therein that implements a traditional queuing method.
Figure 2:
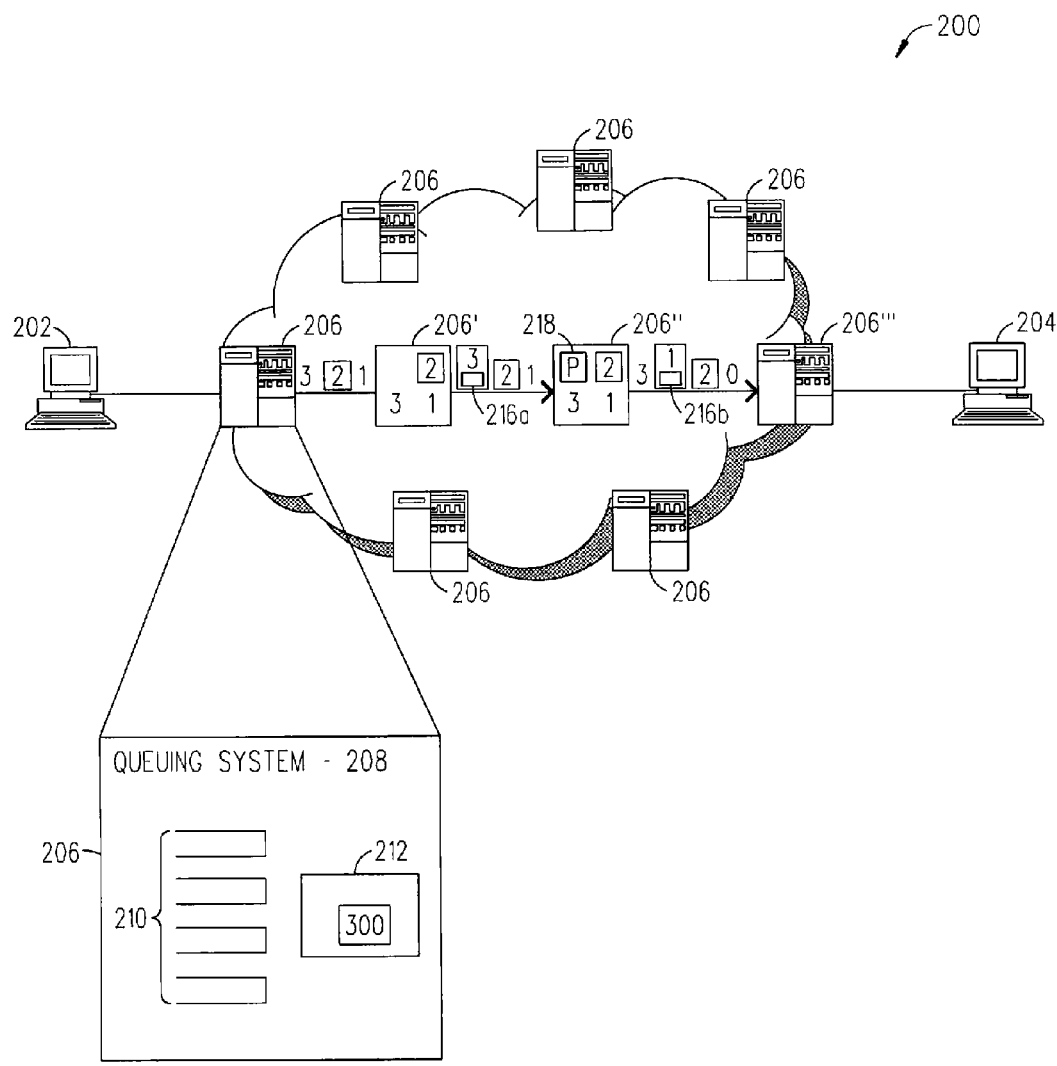
FIG. 2 is a block diagram of a network where a first user communicates with a second user through a series of routers/nodes each of which have a queuing system incorporated therein that implements a queuing method disclosed in co-pending U.S. patent application Ser. No. 10/936,314.
Figure 3:
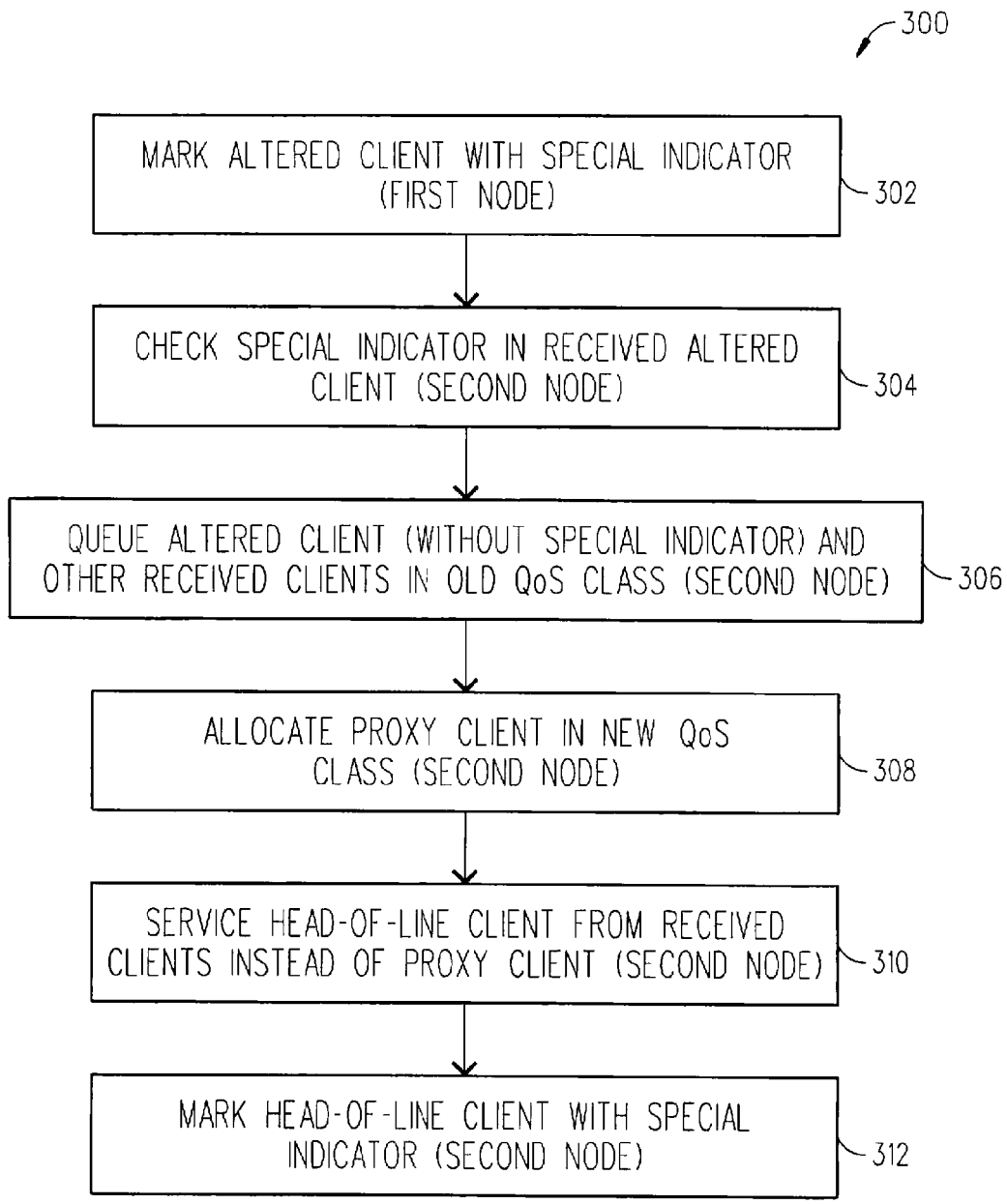
FIG. 3 is a flowchart illustrating the steps of the queuing method used in each of the routers/nodes shown in FIG. 2 to prevent the reordering of packets traveling between the routers/nodes.
Figure 4:
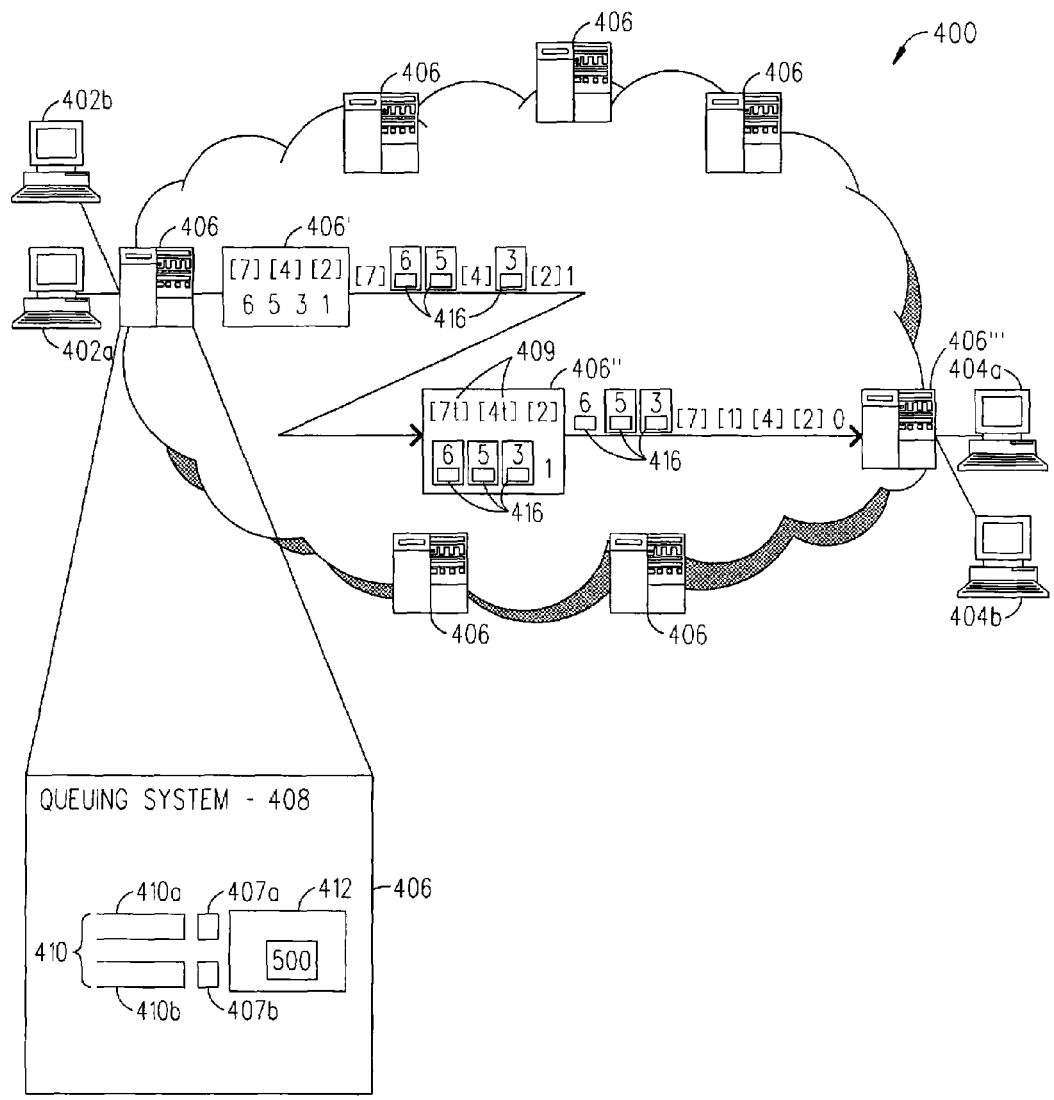
FIG. 4 is a block diagram of a network where one user communicates with another user through a series of routers/ nodes each of which have a queuing system incorporated therein that implements a queuing method in accordance with the present invention.
Figure 5:
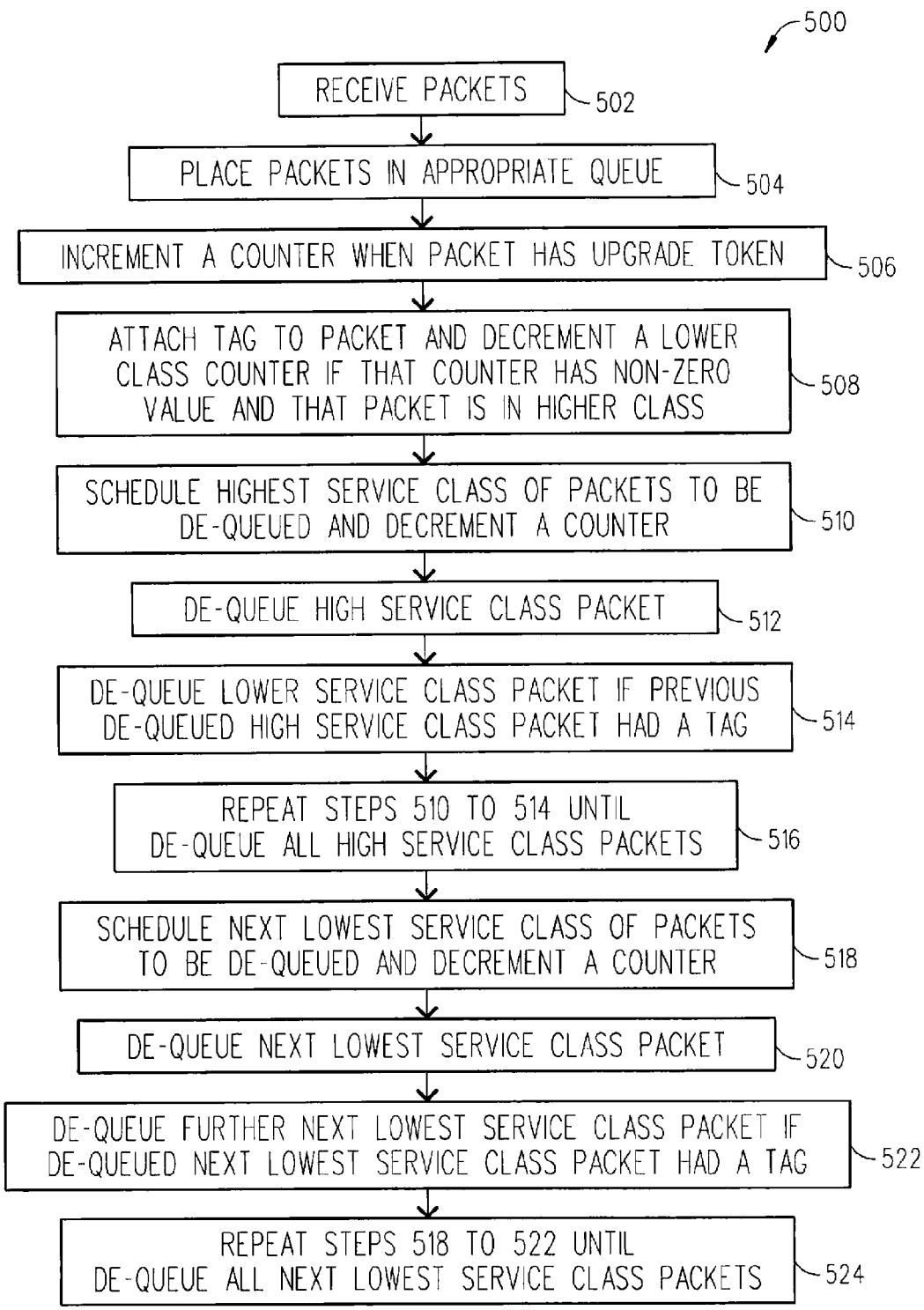
FIG. 5 is a flowchart illustrating the steps of the queuing method used in each of the routers/nodes shown in FIG. 4 to prevent the reordering of packets traveling between the routers/nodes in accordance with the present invention.

Referring to FIGS. 4-5, there are respectively illustrated a diagram of an exemplary packet switched network 400 and a flowchart of a queuing method 500 in accordance the present invention. The queuing method 500 like the aforementioned queuing method 300 eliminates the reordering of packets within a flow due to an alteration of a packet's QoS class. However, the queuing method 500 is an improvement over the aforementioned queuing method 300 because the queuing method 500 addresses the packet reordering packet by using tags and manipulating counters without needing to insert and remove proxy packets into and from the queue. Thus, the queuing method 500 is simpler to implement and more efficient in terms of performance than the aforementioned queuing method 300.

The basic idea of the queuing method 500 is to let the packets that are inserted in a higher priority service class queue carry the upgrade information rather than using proxy packets. To accomplish this, the queuing method 500 uses tags and a set of counters and manipulates the counters to allow the QoS Class upgrade behavior without experiencing the problematical re-ordering of packets. An exemplary scenario of the queuing method 500 in operation along with some exemplary pseudo-code is discussed below and then a detailed discussion is provided about the different steps of the present invention.

In the exemplary scenario shown in FIG. 4, the network 400 has multiple source computers 402a and 402b (only two shown) that communicate with multiple destination computers 404a and 404b (only two shown) via multiple packet switched routers/nodes 406 (only 9 routers/nodes 406 are shown). Each router 406 includes a queuing system 408 which has multiple queues 410 and a scheduler 412 which together use stored instructions to implement the queuing method 500. In this example, assume source computer 402a has sent four packets 1, 3, 5 and 6 which are received at router 406' and are destined for destination computer 404a. The packets 1, 3, 5 and 6 belong to the same flow (e.g., TCP flow) and are classified to be in a low priority class (class-0). And, assume source computer 402b has sent three packets 2, 4 and 7 which are received at router 406' and are destined for destination computer 404b. The packets 2, 4 and 7 belong to another flow (e.g., TCP flow) and are classified to be in a high priority class (class-1).

The router 406' queues packets 2, 4 and 7 in a higher precedence queue (Q1) 410a and queues packets 1, 3, 5 and 6 in a lower precedence queue (Q0) 410b. Assume packets 1, 2, 3, 4, 5, 6 and 7 all find empty output queues in router 406', i.e., they don't have to wait before being transmitted. Also, assume that packets 3, 5 and 6, having complied with a certain policy, are promoted by the scheduler 412 (or by any policy enforcement function, e.g., a policer or a classifier) in router 406' to the higher priority class (class-1). The altered packets 3, 5 and 6 are marked with a special indicator/token 416 that is used to identify their old QoS class (e.g., class-0) as well as their new QoS class (e.g., QoS class-1). The special indicator/token 416 also indicates that the class of service of packets 3, 5 and 6 had been altered. The router 406' transmits the packets in the order 1, 2, 3, 4, 5, 6 and 7 to the downstream router 406".

At the downstream router 406", packet 1 is received and placed/queued in the lower precedence queue (Q0) 410b (steps 502 and 504). Assume packet 1 finds packet 0 being transmitted and has to wait in the lower precedence queue (Q0) 410b. While packet 1 is waiting, the downstream router 406" receives packets 2, 3, 4, 5, 6 and 7 (step 502). The router 406' places/queues the packets 3, 5 and 6 in the lower precedence queue (Q0) 410b and places/queues the packets 2, 4 and 7 in the higher precedence queue (Q1) 410a (step 504). When packet 1 arrives, the router 406" checks to determine if packet 1 is carrying the special indicator/token 416 which in this example it can be seen that packet 1 is not carrying the special indicator/token 416. In addition, the router 406" checks to determine if there is a lower service class than the service class of packet 1 which in this example there is not since packet 1 is in the lowest service class (class-0).

Upon the arrival of packet 2, the router 406" checks to determine if packet 2 is carrying the special indicator/token 416 which in this example packet 2 is not carrying the special indicator/token 416. In addition, the router 406" checks to determine if there is a lower service class than the service class of packet 2 which in this example there is a lower service class (class-0) since packet 2 is in a high service class (class-1). As such, the router 406" determines if there is a non-zero value in an upgrade_counter 407b associated with the lower precedence class (class-0) which at this point the upgrade_counter 407b is assumed to have a zero value.

Upon the arrival of packet 3, the router 406" determines that packet 3 is carrying the special indicator/token 416 and as a result the router 406" increments a value of an upgrade_counter 407b that is associated with the lower precedence class (class-0)(step 506). The incrementing of the value in the upgrade_counter 407a indicates that the lower precedence service class is "owed" one upgrade which will be discussed in detail below. In addition, the router 406" checks to determine if there is a lower service class than the service class of packet 3 which in this example there is not since packet 3 is part of the lowest service class (class-0).

Upon the arrival of packet 4, the router 406" checks to determine if packet 4 is carrying the special indicator/token 416 which in this example packet 4 is not carrying the special indicator/token 416. In addition, the router 406" checks to determine if there is a lower service class than the service class of packet 4 which in this example there is a lower service class since packet 4 is in the high service class (class-1). As such, the router 406" determines if there is a non-zero value in an upgrade_counter 407b associated with the lower precedence class (class-0) which there is since the upgrade_counter 407b currently has a value of "1". As a result, the router 406" attaches a tag 409 to packet 4 and decrements the value of the upgrade_counter 407b which in this case means the upgrade_counter 407b now has a zero value (step 508). In one embodiment, the tag 409 can be appended to packet 4 and if this happens then the tag 409 would be removed in the subsequent de-queue stage (steps 510-524). In another embodiment, the tag 409 associated with packet 4 can be stored separately as packet "meta-data".

Upon the arrival of packet 5, the router 406" determines that packet 5 is carrying the special indicator/token 416 and as a result the router 406" increments a value of an upgrade_counter 407b that is associated with the lower precedence class (class-0)(step 506). In this example, the upgrade_counter 407b now has a value of "1". In addition, the router 406" checks to determine if there is a lower service class than the service class of packet 5 which in this example there is not since packet 5 is associated with the lowest service class (class-0).

Upon the arrival of packet 6, the router 406" determines that packet 6 is carrying the special indicator/token 416 and as a result the router 406" increments a value of an upgrade_counter 407b that is associated with the lower precedence class (class-0)(step 506). In this example, the upgrade_counter 407b now has a value of "2". In addition, the router 406" checks to determine if there is a lower service class than the service class of packet 6 which in this example there is not since packet 6 is associated with the lowest service class (class-0).

Upon the arrival of packet 7, the router 406" checks to determine if packet 7 is carrying the special indicator/token 416 which in this example packet 7 is not carrying the special indicator/token 416. In addition, the router 406" checks to determine if there is a lower service class than the service class of packet 7 which in this example there is a lower service class since packet 7 is in the high service class (class-1). As such, the router 406" determines if there is a non-zero value in an upgrade_counter 407b associated with the lower precedence class (class-0) which there is since the upgrade_counter 407b currently has a value of "2". Thus, the router 406" attaches a tag 409 to packet 7 and decrements the value of the upgrade_counter 407b which in this example means the upgrade_counter 407b now has a value of "1" (step 508).

A table has been provided next to graphically illustrate what the router 406" has performed up to this point in the exemplary scenario while en-queuing the received packets 1, 2, 3, 4, 5, 6, and 7. Table #1 is as follows:

TABLE #1

| | packet | | | | | | |
|---|---|---|---|---|---|---|---|
| | [7] | 6* | 5* | [4] | 3* | [2] | 1 |
| trigger tag 409 | Y | N | N | Y | N | N | N |
| Q1 upgrade_counter 407a | 0 | 0 | 0 | 0 | 0 | 0 | 0 |
| Q0 upgrade_counter 407b | 1 | 2 | 1 | 0 | 1 | 0 | 0 | where:
[ ]: higher priority packet.
( ): lower priority packet that received higher priority service.
*upgrade token 416 (same as rectangle under the number shown in FIG. 4)
Y/N: Trigger tag 409 is set/not-set for packet.

A brief summary about for the en-queueing stage (steps 502-508) in the exemplary scenario follows:

1. Packets 2, 4, 7 are high priority and put in the higher precedence queue (Q1) 410a (steps 502 and 504).

2. Packets 1, 3, 5, 6 are low priority and put in the lower precedence queue (Q0) 410b (steps 502 and 504).

3. Since packets 3, 5, 6 carry upgrade tokens 416, the upgrade_counter 407b for the lower precedence queue (Q0) 410b is incremented (step 506).

4. When packet 2 is put in the higher precedence queue (Q1) 410a, since upgrade_counter 407b is 0, nothing else happens but when packet 4, 7 are put in the higher precedence queue (Q1) 410a because the upgrade_counter 407b for the lower precedence queue (Q0) 410b is non-zero, a trigger tag 409 is put on packets 4, 7 and the upgrade_counter 407b is decremented (step 508).

Below is an exemplary pseudo-code description of the en-queueing stage (steps 502-508) of the queuing method 500:

1) if (packet carries a token) then
      upgrade_count[class]++;
2) if (class != 0 AND (upgrade_count[class-1] > 0)) then
      Attach trigger tag to packet;
      upgrade_count[class-1]--; and
3) en-queue the packet.
where:
the counters are represented as upgrade_count[class] and "class" is a number and represents a service class.
the term "class !=0" means "if not lowest priority class".

To continue the discussion of the exemplary scenario, the router 406" and in particular the scheduler 412 next schedules the highest service class (class-1) to be de-queued and decrements if needed a non-zero value to zero in the upgrade_counter 407a associated with the highest service class (class-1)(step 510). In this example, the scheduler 412 does not need to decrement the value of the upgrade_counter 407a since it already had a value of "0". Thereafter, the scheduler 412 de-queues packet 2 since it is associated with the highest service class (class-1) and is currently at the head-of-the-line in the higher precedence queue (Q1) 410b (step 512). The scheduler 412 also checks to determine if packet 2 has a tag 409 attached/appended thereto which in this case packet 2 does not have a tag 409.

The scheduler 412 then schedules and de-queues packet 4 since it is associated with the highest service class (class-1) and is currently at the head-of-the-line in the higher precedence queue (Q1) 410a (step 512). The scheduler 412 also checks to determine if packet 4 has a tag 409 attached/appended thereto which in this case packet 4 does have a tag 409. As such, the scheduler 412 de-queues packet 1 which is currently at the head-of-the-line in the lower priority queue (Q0) 410b that is associated with the next lowest service class (class-0) (step 514). This is the step where the service class priority upgrade is acted upon the lower class packet.

Thereafter, the scheduler 412 schedules and de-queues packet 7 since it is associated with the highest service class (class-1) and is currently at the head-of-the-line in the higher precedence queue (Q1) 410a (step 512). The scheduler 412 also checks to determine if packet 7 has a tag 409 attached/appended thereto which in this case packet 7 does have a tag 409. As such, the scheduler 412 de-queues packet 3 which is currently at the head-of-the-line in the lower priority queue (Q0) 410b that is associated with the next lowest service class (class-0)(step 514). Again, this is the step where the service class priority upgrade is acted upon the lower class packet.

At this point, all of the packets 2, 4, and 7 have been de-queued, the scheduler 412 then schedules the next lowest service class (class-0) to be de-queued and decrements if needed a non-zero value to zero in the upgrade_counter 407b associated with the next lowest service class (class-0)(step 518). In this example, the scheduler 412 needs to decrement the value of the upgrade_counter 407b associated with the next lowest service class since it had a value of "1". This ensures that service class upgrades are not stored for the future. Since all higher service classes have empty queues, this service class is already getting the best service possible by the scheduler 412. A similar effect was achieved in aforementioned queuing method 300 when the higher priority queue was emptied, there was, obviously, no "proxy packets"

left in it either. The scheduler 412 then schedules and de-queues packet 5 since it is associated with the lower service class (class-0) and is currently at the head-of-the-line in the lower precedence queue (Q0) 410b (step 520). The scheduler 412 also checks to determine if packet 5 has a tag 409 attached/appended thereto which in this case packet 5 does not have a tag 409. Next, the scheduler 412 schedules and de-queues packet 6 since it is associated with the lower service class (class-0) and is currently at the head-of-the-line in the lower precedence queue (Q0) 410b (step 520). The scheduler 412 also checks to determine if packet 6 has a tag 409 attached/appended thereto which in this case packet 6 does not have a tag 409.

A table has been provided next to graphically illustrate what the router 406" has performed while scheduling and de-queuing packets 1, 2, 3, 4, 5, 6 and 7 in the exemplary scenario. Table #2 is as follows:

TABLE #2

|  | packet | | | | | | |
|---|---|---|---|---|---|---|---|
|  | 6* | 5* | (3*) | [7] | (1) | [4] | [2] |
| trigger tag 409 | N | N | N | Y | N | Y | N |
| Q1 upgrade_counter 407a | 0 | 0 | 0 | 0 | 0 | 0 | 0 |
| Q0 upgrade_counter 407b | 0 | 0 | 1 | 1 | 1 | 1 | 1 | where:
[ ]: higher priority packet.
( ): lower priority packet that received higher priority service.
*upgrade token 416 (same as rectangle under the number shown in FIG. 4)
Y/N: Trigger tag 409 is set/not-set for packet.

A brief summary about the scheduling and de-queing stages (steps 510-524) in the exemplary scenario follows:

1. The first packet in the higher priority queue (Q1) 410a is packet 2 and the next are packets 4, 7 they are scheduled and de-queued. When packet 4 is de-queued, since it has a trigger tag 409, a packet, packet 1, from the lower priority queue (Q0) 410b is also de-queued. Since packet 7 also has a tag 409 this triggers a de-queue of packet 3 (steps 510-516).

2. Now the higher priority queue (Q1) 410a is empty, so the lower priority queue (Q0) 410b is serviced by the scheduler 412 and packets 5 and 6 are scheduled and de-queued. When packet 5 is scheduled, the upgrade_counter 407b for the lower priority queue (Q0) 410b is not 0 so it's decremented (steps 518-524).

In this exemplary scenario, the scheduler 412 was assumed to be a priority scheduler 412. If the scheduler 212 was a rate scheduler 412 then an extra check would be made to make sure that the higher priority (higher rate) class queue 410a was empty before decrementing the upgrade_counter 407a. Below is an exemplary pseudo-code description of the scheduling stage (steps 510 and 518) of the queuing method 500:

```
1) Schedule a service class (scheduled_class)
Priority schedulers:
2a) if (upgrade_count[scheduled_class] > 0) then
        upgrade_count [scheduled_class--];
Rate schedulers:
2b) if ((upgrade_count[scheduled_class] > 0) AND
        (higher priority class queue is empty)) then
        upgrade_count [scheduled_class--].
```

And, below is an exemplary pseudo-code description of the de-queueing stage (steps 512-516 and 520-524) of the queuing method 500:

```
1) de-queue packet from the service class: scheduled_class.
2) if ((de-queued packet has trigger tag) AND
        (lower priority class queue exists and is non-empty))
        scheduled_class--;
    goto 1).
```

To summarize the queuing method 500, the router 406" operates to receive the packets (step 502). The router 406" places each of the received packets belonging to a same service class into a queue 410a or 410b that is associated with the same service class (step 504). Then, the router 406" increments a value of an upgrade counter 407a or 407b associated with the same service class each time one of the received packets belongs to the same service class and is also carrying an upgrade token 416 (step 506). The router 406" attaches a tag 409 to a received packet and decrements a value of the upgrade_counter 407b in a next lowest service class if that counter has a non-zero value and if the received packet belongs to a higher service class (step 508). Then, the router 406" schedules a highest service class to be de-queued and decrements if needed a non-zero value to zero in the upgrade_counter 407a associated with the highest service class (step 510). Thereafter, the router 406" de-queues one of the queued packets from the queue 410a associated with the highest service class (step 512). If the de-queued packet has a tag 409, then the router 406" de-queues one of the queued packets at a head-of-the-line in the queue 410b associated with the next lowest service class (step 514). The router 406' repeats the first scheduling step 510, the first de-queing step 512 and if necessary the second de-queing step 514 until all of the packets in the queue 410a associated with the highest service class have been de-queued (step 516). Then, the router 406" schedules the next lowest service class to be de-queued and decrements if needed a non-zero value to zero in the upgrade_counter 407b associated with the next lowest service class (step 518). Thereafter, the router 406" de-queues one of the queued packets from the queue 410b associated with the next lowest service class (step 520). If the de-queued packet has a tag 409, then the router 406" de-queues one of the queued packets at a head-of-the-line in the queue (not shown) associated with a further next lowest service class (step 522). The router 406" repeats the second scheduling step 518, the third de-queing step 520 and if necessary the fourth de-queing step 522 until all of the packets in the queue 410b associated with the next lowest service class have been de-queued (step 524). The router 406" also performs these de-queing steps for the packets in the further next lowest service class and then for all the packets in the remaining lower service classes.

From the foregoing, it can be appreciated that the queuing method 500 includes three different packet processing stages, en-queue (insertion in the output queue), scheduling and de-queue (removal from the output queue). Each of these processing stages can be summarized as follows:

En-queue stage: At the output queue packet insertion stage, or the "en-queue" stage, packets belonging to a service class are inserted in the output queue associated with that service class. When a packet arrives to this stage, if it carries an upgrade token, the upgrade_count value for the service class the packet belongs to is incremented. This indicates that the service class is "owed" one upgrade. In addition, if the upgrade_count value of the lower priority class (if it exists, i.e., current class is not lowest) is non-zero, a "trigger" tag is attached to the current packet and the upgrade_count of the lower priority service class is decremented. This step has nothing to do with the current packet nor the service class it belongs to rather this is part of the mechanism that enables the "paying back" of the owed upgrade to the lower priority class. Specifically, this step will trigger a packet from the lower service class to get de-queued right after the current packet has been de-queued.

Scheduling stage: Once a service class has been scheduled by the scheduler, the upgrade_count value for that service is decremented. This is done to ensure that a service class does not accumulate upgrades for the future when the higher priority class queue is empty. For a priority scheduler, if a service class is scheduled, then the higher priority class is empty and the upgrade_count is decremented if it was non-zero. For a rate scheduler, an extra check is made to make sure that the higher priority (higher rate) class queue is empty before decrementing the counter.

De-queue stage: At the output queue packet removal stage, or the "de-queue" stage, a packet belonging to the service class that was scheduled by the scheduler is removed from the head-of-the-line of the output queue associated with that service class. This is the step where a service class priority upgrade is acted upon, i.e., a packet from the lower priority service class is de-queued after the scheduler decided to schedule the higher priority service class for transmission. The way this can be done is to check if the de-queued packet has an associated trigger tag, if so, then the lower priority service class is "paid back" with an upgraded packet if its queue is non-empty. In other words, if a packet that was de-queued has a trigger tag it will trigger a packet from the lower priority class to be de-queued as well.

Following are some additional features, advantages and uses of the QoS queuing method 500 of the present invention:

The queuing method 500 fulfills the same objectives as queuing method 300 while avoiding a major drawback which is the loss of performance. The insertion and removal of the proxy packet in queuing method 300 roughly doubles the queuing cost (including expensive input/output operations) of upgraded packets. The queuing method 500 uses tags and manipulates counters to achieve the same goal without any added queuing cost plus the doubled processing cost is eliminated at every router along the path of the packet.

The implementation of the queuing method 500 does not require a change in the standard packet fields. As such, the queuing method 500 can be used in standard bodies like IETF (DiffServ, MPLS, Intserv, . . . ) and other standard organizations that have direct or indirect QoS support.

The QoS queuing method 500 enables better utilization and increased efficiency in a server. Because, clients from a lower class can be effectively promoted to utilize unused reserved bandwidth of the higher classes.

The QoS queuing method 500 allows for Service Level Agreements that involve rate reservation per class and also allows for the efficient usage of the reserved bandwidth for each class when there is not enough traffic to use the reserved rates. The QoS queuing method 500 also allows new types of Service Level agreements, where customer traffic is automatically upgraded to fill the most expensive class first, then the second most expensive, and so on.

The QoS queuing method 500 can be used in cell phone networks so as to allow for efficient usage of any unused reserved bandwidth dedicated for voice, video and data to speed-up wireless internet connectivity.

The queuing method 500 is not limited to being used in networks with routers and in fact can be used in a wide variety of queuing model like bank queues, airline queues, etc. . . . . .

It should be appreciated that many components and details associated with the network 400 and the routers 406 described above are well known in the industry. Therefore, for clarity, the description provided above omitted those well known components and details which are not necessary to understand the present invention.

Although one embodiment of the present invention has been illustrated in the accompanying Drawings and described in the foregoing Detailed Description, it should be understood that the invention is not limited to the disclosed embodiment, but is capable of numerous rearrangements, modifications and substitutions without departing from the invention as set forth and defined by the following claims.

The invention claimed is:

1. A method in a packet switched node for preventing the reordering of a plurality of packets within a flow after a Quality of Service (QoS) class had been altered for at least one packet associated with the plurality of packets, said method comprising the steps of:

receiving the plurality of packets by said node;

placing each of the received packets belonging to a same service class into a queue associated with the same service class;

incrementing a value of a counter associated with the same service class each time one of the received packets belongs to the same service class and also has an upgrade token attached thereto; and, if there is a counter with a non-zero value associated with a lower service class and if one of the received packets belongs to a higher service class, then associating a tag to that received packet and decrementing the value of the counter in the lower service class.

2. The method of claim 1, further comprising the steps of:

scheduling a highest service class to be de-queued and decrementing if needed a non-zero value to zero in a counter associated with the highest service class;

de-queing one of the queued packets from the queue associated with the highest service class;

if the de-queued packet has the tag associated therewith, then de-queing one of the queued packets at a head-of-the-line in the queue associated with the next lowest service class; and repeating the first scheduling step, the first de-queing step and if necessary the second de-queing step until all of the packets in the queue associated with the highest service class have been de-queued.

3. The method of claim 2, further comprising the steps of:

scheduling the next lowest service class to be de-queued and decrementing if needed a non-zero value to zero in a counter associated with the next lowest service class;

de-queing one of the queued packets from the queue associated with the next lowest service class;

if the de-queued packet has the tag associated therewith, then de-queing one of the queued packets at a head-of-the-line in the queue associated with a further next lowest service class; and repeating the second scheduling step, the third de-queing step and if necessary the fourth de-queing step until all of the packets in the queue associated with the next lowest service class have been de-queued.

4. The method of claim 1, wherein said upgrade token indicates an old QoS class and a new QoS class.

5. The method of claim 1, wherein said step of associating the tag to the received packet includes appending the tag to the received packet.

6. The method of claim 1, wherein said step of associating the tag to the received packet includes storing the tag as packet meta-data separately from the received and queued packet.

7. A packet switched node, comprising
a queuing system including one or more queues and a scheduler that together prevent the reordering of a plurality of packets within a flow after a Quality of Service (QoS) class had been altered for at least one packet which is associated with the plurality of packets, said node operative to:
receive the plurality of packets;
place each of the received packets belonging to a same service class into the queue associated with the same service class;
increment a value of a counter associated with the same service class each time one of the received packets belongs to the same service class and also has an upgrade token attached thereto; and
if there is a counter with a non-zero value associated with a lower service class and if one of the packets is received that belongs to a higher service class, then associate a tag to that received packet and decrement the value of the counter in the lower service class.

8. The packet switched node of claim 7, wherein said queuing system schedules and de-queues the queued packets by implementing stored instructions to:
schedule a highest service class to be de-queued and decrement if needed a non-zero value to zero in a counter associated with the highest service class;
de-queue one of the queued packets from the queue associated with the highest service class;
if the de-queued packet has the tag associated therewith, then de-queue one of the queued packets at a head-of-the-line in the queue associated with the next lowest service class; and
repeating the first schedule operation, the first de-queue operation and if necessary the second de-queue operation until all of the packets in the queue associated with the highest service class have been de-queued.

9. The packet switched node of claim 8, wherein said queuing system further schedules and de-queues the queued packets by implementing stored instructions to:
schedule the next lowest service class to be de-queued and decrementing if needed a non-zero value to zero in a counter associated with the next lowest service class;
de-queue one of the queued packets from the queue associated with the next lowest service class;
if the de-queued packet has the tag associated therewith, then de-queue one of the queued packets at a head-of-the-line in the queue associated with a further next lowest service class; and
repeating the second schedule operation, the third de-queue operation and if necessary the fourth de-queue operation until all of the packets in the queue associated with the next lowest service class have been de-queued.

10. The packet switched node of claim 7, wherein said upgrade token indicates an old QoS class and a new QoS class.

11. The packet switched node of claim 7, wherein said queuing system associated the tag to the received packet by appending the tag to the received packet.

12. The packet switched node of claim 7, wherein said queuing system associated the tag to the received packet by storing the tag as packet meta-data separately from the received and queued packet.

13. A packet switched network comprising:
a first node that upgrades a Quality of Service (QoS) class of at least one packet which is associated with a plurality of packets within a flow and then marks said at least one upgraded packet with an upgrade token; and
a second node that receives the at least one upgraded packet and the remaining packets of the plurality of packets and services the at least one upgraded packet and the remaining packets of the plurality of packets such that there will be no reordering of the at least one upgraded packet and the remaining packets in the plurality of packets by:
placing each of the received packets belonging to a same service class into a queue associated with the same service class;
incrementing a value of a counter associated with the same service class each time one of the received packets belongs to the same service class and also has an upgrade token attached thereto; and
if there is a counter with a non-zero value associated with a lower service class and if one of the received packets belongs to a higher service class, then associating a tag to that received packet and decrementing the value of the counter in the lower service class.

14. The packet switched network of claim 13, wherein said downstream node schedules and de-queues the queued packets by:
scheduling a highest service class to be de-queued and decrementing if needed a non-zero value to zero in a counter associated with the highest service class;
de-queing one of the queued packets from the queue associated with the highest service class;
if the de-queued packet has the tag associated therewith, then de-queing one of the queued packets at a head-of-the-line in the queue associated with the next lowest service class; and
repeating the first scheduling step, the first de-queing step and if necessary the second de-queing step until all of the packets in the queue associated with the highest service class have been de-queued.

15. The packet switched network of claim 14, wherein said downstream node schedules and de-queues the queued packets by:
scheduling the next lowest service class to be de-queued and decrementing if needed a non-zero value to zero in a counter associated with the next lowest service class;
de-queing one of the queued packets from the queue associated with the next lowest service class;
if the de-queued packet has the tag associated therewith, then de-queing one of the queued packets at a head-of-the-line in the queue associated with a further next lowest service class; and
repeating the second scheduling step, the third de-queing step and if necessary the fourth de-queing step until all of the packets in the queue associated with the next lowest service class have been de-queued.

16. The packet switched network of claim 13, wherein said upgrade token indicates an old QoS class and a new QoS class.

17. The packet switched network of claim 13, wherein said downstream node associated the tag to the received packet by appending the tag to the received packet.

18. The packet switched network of claim 13, wherein said downstream node associated the tag to the received packet by storing the tag as packet meta-data separately from the received and queued packet.

* * * * *